(12) United States Patent
Sollom et al.

(10) Patent No.: US 7,228,266 B1
(45) Date of Patent: Jun. 5, 2007

(54) INSTRUCTION PROCESSOR EMULATOR HAVING SEPARATE OPERAND AND OP-CODE INTERFACES

(75) Inventors: Jason D. Sollom, Champlin, MN (US); James A. Williams, White Bear Lake, MN (US)

(73) Assignee: Unisys Corporation, Blue Bell, PA (US)

( * ) Notice: Subject to any disclaimer, the term of this patent is extended or adjusted under 35 U.S.C. 154(b) by 452 days.

(21) Appl. No.: 10/729,666

(22) Filed: Dec. 5, 2003

(51) Int. Cl.
G06F 9/455 (2006.01)

(52) U.S. Cl. .................. 703/26; 717/118; 717/138; 717/148; 703/23; 703/28

(58) Field of Classification Search .............. 703/26, 703/23, 25; 717/137, 118, 138, 148
See application file for complete search history.

(56) References Cited

U.S. PATENT DOCUMENTS

| | | | | |
|---|---|---|---|---|
| 4,789,924 A * | 12/1988 | Fukuta | ................. | 703/23 |
| 5,819,063 A * | 10/1998 | Dahl et al. | ................. | 703/27 |
| 5,894,484 A * | 4/1999 | Illes et al. | ................. | 714/738 |
| 5,991,531 A * | 11/1999 | Song et al. | ................. | 703/26 |
| 6,039,765 A * | 3/2000 | Trissel | ................. | 703/26 |
| 6,075,937 A * | 6/2000 | Scalzi et al. | ................. | 703/23 |
| 6,122,638 A * | 9/2000 | Huber et al. | ........... | 707/103 Y |
| 6,233,672 B1 * | 5/2001 | Lynch | ................. | 712/222 |
| 6,256,784 B1 * | 7/2001 | Grove | ................. | 717/139 |
| 6,272,453 B1 * | 8/2001 | Hoerig et al. | ................. | 703/27 |
| 6,401,155 B1 * | 6/2002 | Saville et al. | ................. | 710/266 |
| 6,647,489 B1 * | 11/2003 | Col et al. | ................. | 712/226 |
| 7,020,766 B1 * | 3/2006 | Wang et al. | ................. | 712/227 |
| 7,096,322 B1 * | 8/2006 | Sollom et al. | ................. | 711/143 |
| 7,120,572 B1 * | 10/2006 | Liang | ................. | 703/26 |
| 2001/0054140 A1 * | 12/2001 | Oberman et al. | ........... | 712/223 |
| 2002/0072893 A1 * | 6/2002 | Wilson | ................. | 703/26 |
| 2002/0157084 A1 * | 10/2002 | Davis et al. | ................. | 717/5 |
| 2003/0110478 A1 * | 6/2003 | Duesterwald et al. | ....... | 717/137 |
| 2003/0135844 A1 * | 7/2003 | Yellin et al. | ................. | 717/126 |
| 2004/0230617 A1 * | 11/2004 | Talwar et al. | ................. | 707/200 |
| 2004/0230948 A1 * | 11/2004 | Talwar et al. | ................. | 717/114 |
| 2004/0230949 A1 * | 11/2004 | Talwar et al. | ................. | 717/118 |
| 2005/0028147 A1 * | 2/2005 | Bonilla | ................. | 717/138 |
| 2005/0108495 A1 * | 5/2005 | McKenney et al. | ......... | 711/170 |

* cited by examiner

Primary Examiner—Kamini Shah
Assistant Examiner—Kibrom K. Gebresilassie
(74) Attorney, Agent, or Firm—Beth L. McMahon; Charles A. Johnson; Shumaker & Sieffert, P.A.

(57) ABSTRACT

Techniques are described for emulating an instruction processor for use during the development of a computer system. Specifically, the techniques describe an emulated instruction processor that accurately and efficiently emulates an instruction processor having separate interfaces to fetch op-codes and operands. Further, the emulated instruction processor may provide detection of errors associated with the separate interfaces. By making use of the techniques described herein, detailed information relating to errors associated with the memory architecture may be gathered for use in verifying components within the memory architecture, such as first and second-level caches.

30 Claims, 5 Drawing Sheets

INSTRUCTION PROCESSOR EMULATOR HAVING SEPARATE OPERAND AND OP-CODE INTERFACES

CROSS-REFERENCE TO RELATED APPLICATIONS

This application is related to U.S. patent application Ser. No. 10/683,029, Now pending, entitled "INSTRUCTION PROCESSOR EMULATION HAVING INTER-PROCESSOR MESSAGING ACCOUNTING," filed Oct. 10, 2003, and U.S. patent application Ser. No. 10/683,028, Now U.S. Pat. No. 7,096,322, entitled "INSTRUCTION PROCESSOR WRITE BUFFER EMULATION USING EMBEDDED EMULATION CONTROL INSTRUCTIONS," filed Oct. 10, 2003.

TECHNICAL FIELD

The invention relates to computer systems and, more particularly, emulation techniques to aid in the design and testing of computer systems

BACKGROUND

A computer system typically involves multiple components working in cooperation to perform a task. For example, a computer system may include one or more co-operating instruction processors. These instruction processors may be supported by communication busses, cache memories, shared and dedicated memories, input/output (I/O) devices, interface hardware, and the like.

The process of designing and ensuring proper functionality of these constituent components, i.e., development process, is involved and time consuming. In addition, the demand for computer systems of increasing complexity, such as computer systems that can provide more throughput, further increase the time and resources required to design and ensure the proper functionality of components.

In order to expedite the design process, emulation tools are often used to assist in testing the functionality of a component or system being designed. During this process, one or more emulation modules are often developed to interface with and test the functionality of the components being designed. For example, a designer currently developing a memory architecture may use an emulation module to mimic the functionality of an associated instruction processor. The emulated instruction processor may be used, for example, to interact with the memory architecture being developed in a manner that conforms to that of an actual instruction processor in order to test the operation of the memory architecture. As the processor itself may also not yet be implemented, the use of an emulated instruction processor allows the development of the actual instruction processor and the memory architecture to proceed concurrently. In this manner, the development period needed to complete the overall computer system may be compressed.

A designer may develop an emulation module for a particular component by utilizing an editor or other software application to describe the functionality of the component in accordance with a hardware description language (HDL). Examples of widely-used HDLs include the Very high-speed integrated circuits Hardware Description Language (VHDL) and Verilog™, which is described in the IEEE Verilog 1364-2000 standard. These languages support syntaxes that appear similar to software programming languages, such as C++ and Java, and allow the designer to define and simulate components using high-level code by describing the structure and behavior of the components.

While the use of emulation can greatly aid in the development of the computer system, emulation modules may require extended functionality and resources to properly aid the design of computer systems of increasing complexity. For example, an emulated instruction processor may require extended functionality and resources to account for the growing complexity associated with the incorporation of multiple interfaces and data paths within instruction processors to increase data throughput.

An instruction processor executes instructions that comprise operational codes (op-codes) and associated operands. The instruction processor typically fetches these op-codes and associated operands from the memory architecture, and more particularly, an instruction cache. Some conventional instruction processors incorporate separate interfaces for fetching the op-codes and the operands. The interfaces typically comprise separate data paths between the instruction processor and the memory architecture. These separate interfaces and data paths allow the instruction processor to independently fetch the operands and the op-codes from the instruction cache. In other words, the instruction processor may independently, and perhaps simultaneously, issue requests to the cache to fetch the stored operands and op-codes. Time-saving techniques directed to the efficient and accurate development and configuration of an emulated instruction processor having separate op-code and operand interfaces and data paths may further reduce the overall time necessary to develop a computer system.

SUMMARY

In general, techniques are described for emulating an instruction processor for use during the development of a computer system. Specifically, the techniques describe an emulated instruction processor that accurately and efficiently emulates an instruction processor having separate interfaces to fetch op-codes and operands. Further, the emulated instruction processor may provide detection of errors associated with the separate interfaces. By making use of the techniques described herein, detailed information relating to errors associated with the memory architecture may be gathered for use in verifying components within the memory architecture, such as first and second-level caches.

In accordance with the techniques described herein, the emulated instruction processor includes a function and address (FA) memory and a set of data memories. The FA memory stores test procedures in the form of executable instructions to test the functionality of other components of the computer system. For example, the test procedures may direct the emulated instruction processor to issue read operations to the operand and op-code interfaces to test the memory architecture external to the emulated instruction processor.

The internal set of data memories of the emulated instruction processor store reference data. During the test procedures, the emulated instruction processor compares the reference data to operands and op-codes received from the external memory architecture via the separate operand and op-code interfaces. To facilitate the comparison, the emulated instruction processor may include a set of mask memories to store bit masks, a set of comparators, and an error detection modules. The emulated instruction processor may apply the masks to filter various portions of the received op-codes and operands. The internal comparators compare the filtered operands and op-codes to the reference data, and error detection module verifies the comparison. Upon detecting an error, i.e., when the received op-code or operand does not match the corresponding reference data, the error detection module generates information to record the error.

To facilitate testing of the separate emulated op-code and operand interfaces, the emulated instruction processor may maintain a set of pointers that control access to the reference data stored by the internal memories. Each pointer corresponds to a respective one of the internal data memories and may be separately controlled. In other words, the emulated instruction processor updates each of the pointers when requests are issued to the corresponding interface. For example, upon issuing a read instruction to the operand interface, the emulated instruction processor automatically increments the pointer associated with the data memory that stores reference data for the operand interface. In this manner, the emulated instruction process coordinates the comparison of the correct reference data from the memories to the operands and op-codes received from the independent interfaces, thereby facilitating testing of the independent op-code and operand interfaces and the external other components connected thereto.

In one embodiment, the invention is directed to a processor-based method performed by software emulating an instruction processor. The method comprises processing read instructions with an emulated processor executing within an emulation environment to output independent read requests via an operand interface and an op-code interface of the emulated processor. The method further comprises independently comparing op-code reference data and operand reference data to operands and op-codes received in response to the read requests; and recording results of the independent comparisons.

In another embodiment, the invention is directed to a processor-based system for emulating an instruction processor. The system comprises a computing system to provide an emulation environment, and software executing within the emulation environment to emulate an instruction processor having an operand interface and an op-code interface. The software emulates the instruction processor by processing read instructions and outputting corresponding read requests on the operand interface or the op-code interface, and independently comparing op-code reference data and operand reference data to operands and op-codes received from the operand interface and op-code interface in response to the read requests.

In another embodiment, the invention is directed to a processor-based system for emulating an instruction processor. The system comprises compiling means for compiling test software to produce operand reference data, op-code reference data, and an instruction stream having read instructions, and emulating means for emulating an instruction processor having an operand interface and an op-code interface. The emulating means comprises (i) controlling means for controlling the emulated instruction processor to process the read instructions and output corresponding read requests on the operand interface or the op-code interface, (ii) receiving means for receiving operands and op-codes from the operand interface and op-code interface in response to the read requests, and (iii) comparing means for independently comparing the op-code reference data and the operand reference data to the received operands and op-codes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
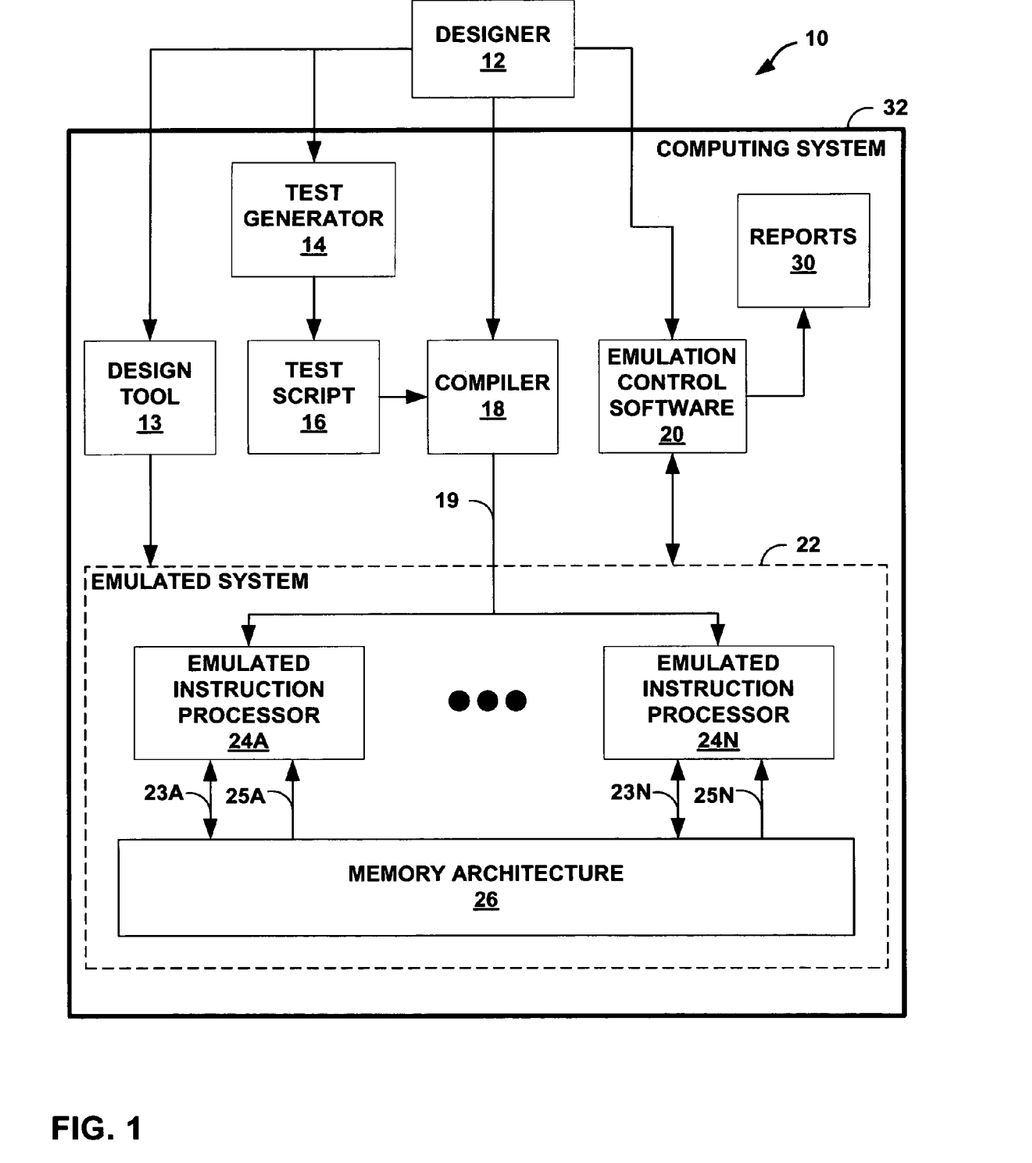
FIG. 1 is a block diagram illustrating an example emulation environment.

FIG. 1 is a block diagram illustrating an example emulation environment 10 in which a designer 12 makes use of computer-aided techniques to aid in the design, simulation and verification of components associated with a computer system. In particular, designer 12 interacts with design tool 13 to develop the constituent components of emulated system 22. In the exemplary embodiment of FIG. 1, emulated system 22 includes one or more emulated processors 24A-24N (collectively referred to as "emulated processors 24") that emulate the functionality of instruction processors to aid in the design and testing of memory architecture 26, which may comprise a hierarchy of caches and memory units. Emulated system 22 may comprise additional components, such as peripheral devices, input/output interfaces, and the like. However, for ease of illustration, these other components are not shown in FIG. 1.

Design tool 13 may comprise a circuit design tool with which designer 12 interacts to develop graphical representations of the components of emulated system 22 in the form of one or more schematic diagrams. Designer 12 invokes design tool 13 to graphically layout the component instances of emulated system 22 and define signals to interconnect the instances. Alternatively, design tool 13 may comprise an editor or other software application with which designer 12 interacts to describe emulated system 22 in accordance with a hardware description language (HDL). An example of a circuit design tool is Concept® HDL from Cadence Design Systems, Inc. of San Jose, Calif. Examples of widely used HDLs include the Very high speed integrated circuits Hardware Description Language (VHDL) and Verilog™.

Designer 12 utilizes test script 16 to test the functionality of the components within emulated system 22, such as memory architecture 26. In particular, designer 12 configures test generator 14 to generate test script 16, which defines software programs for execution by emulated instruction processors 24. Compiler 18 compiles test script 16 to generate one or more streams 19. Streams 19 include instruction streams in the form of machine executable instructions and data streams.

Upon completion of compilation, compiler 18 outputs streams 19 to emulated instruction processors 24. Each of streams 19 is loaded into one or more internal memories (not shown), such as random access memories (RAMs), within a respective one of emulated instruction processors 24.

Once loaded, emulated instruction processors 24 execute the instructions streams of instruction streams 19 and mimic the operation of fully-designed instruction processors to test the constituent components of a computer system. In particular, emulated instruction processors 24 mimic instruction processors that present separate interfaces to memory architecture 26 for independently fetching operands and op-codes. Emulated instruction processors 24 execute instruction streams 19, and issue read requests to memory architecture 26 via respective operand interfaces 23A-23N (collectively "operand interfaces 23") and op-code interfaces 25A-25N (collectively "op-code interfaces 25"). In other words, emulated instruction processors 24 comprise separate interfaces, i.e., operand interface 23 and op-code interface 25, to access data, such as operands, and op-codes respectively. Emulated instruction processors 24 also issue write requests via respective operand interfaces 23A-23N to write data to memory architecture 26. Although illustrated with respect to a multi-processor emulation environment, the techniques may be applied by a single emulated instruction processor and will be described in further detail with reference to emulated instruction processor 24A.

As illustrated, emulated instruction processor 24A includes operand interface 23A and op-code interface 25A for independently fetching data, such as operands, and op-codes, respectively, from memory architecture 26. More specifically, emulated instruction processor 24A issues data read requests, including operand read requests, via operand interface 23A. Independently, emulated instruction processor 24A issues op-code read requests via op-code interface 25A. In response to the request, memory architecture 26 returns data, such as operands, and op-codes via operand interface 23A and op-code interface 25A, respectively. Emulated instruction processor 24A compares the data, e.g., operands, and the op-codes to reference data generated by test scripts 16 to determine whether the expected op-codes and data are received. Emulated instruction processor 24A generates and records error information in the event that a mismatch is detected.

Once execution is complete, designer 12 may invoke emulation control software 20 to analyze the state of emulated system 22 and generate reports 30. Emulation control software 20 may analyze the contents of memory architecture 26 and emulated instruction processors 24, such as internal registers within emulated instruction processors 24, for errors. Emulation control software 20 may compare these contents against expected results computed by compiler 18, and flag the errors in reports 30. In addition, emulated instruction processors 24 may have built in error detection. In particular, emulated instruction processors 24 may be loaded with reference data, and may incorporate functionality to use the reference data during reads from memory architecture 26 to verify that previously executed reads and writes were executed correctly. Reports 30 may indicate results of the error detection, actual results, expected results, and the like.

Reports 30 may, for example, identify errors or unexpected results from the execution of test script 16 in an attempt to aid designer 12 in locating and resolving design errors within emulated system 22 and, in particular, within components with which emulated instruction processors 24 interact, e.g., memory architecture 26. Thus, emulated instruction processors 24 may aid in developing and ensuring proper functionality through executing instructions to test the functionality of the other components within emulated system 22.

Computing system 32 provides a platform for execution of emulation programs and utilities, such as, design tool 13, test generator 14, compiler 18 and emulation control software 20. Computing system 32 may comprise one or more computers, each having a processor, working in cooperation to form emulation environment 10. In particular, each computer included within computing system 32 may execute one or more of the above programs. For example, one computer may execute test generator 14 to generate test script 16. Another computer may execute compiler 18 to compile test script 16. Yet another computer may execute design tool 13, emulated system 22 and emulation control software 20, wherein emulated system 22 executes instruction streams included within data streams 19 and emulation control software 20 analyzes results of executing the instruction streams to generate reports 30. The computers may communicate information, such as test script 16 and data streams 19, via a local area network or any other means of communication.

Figure 2:
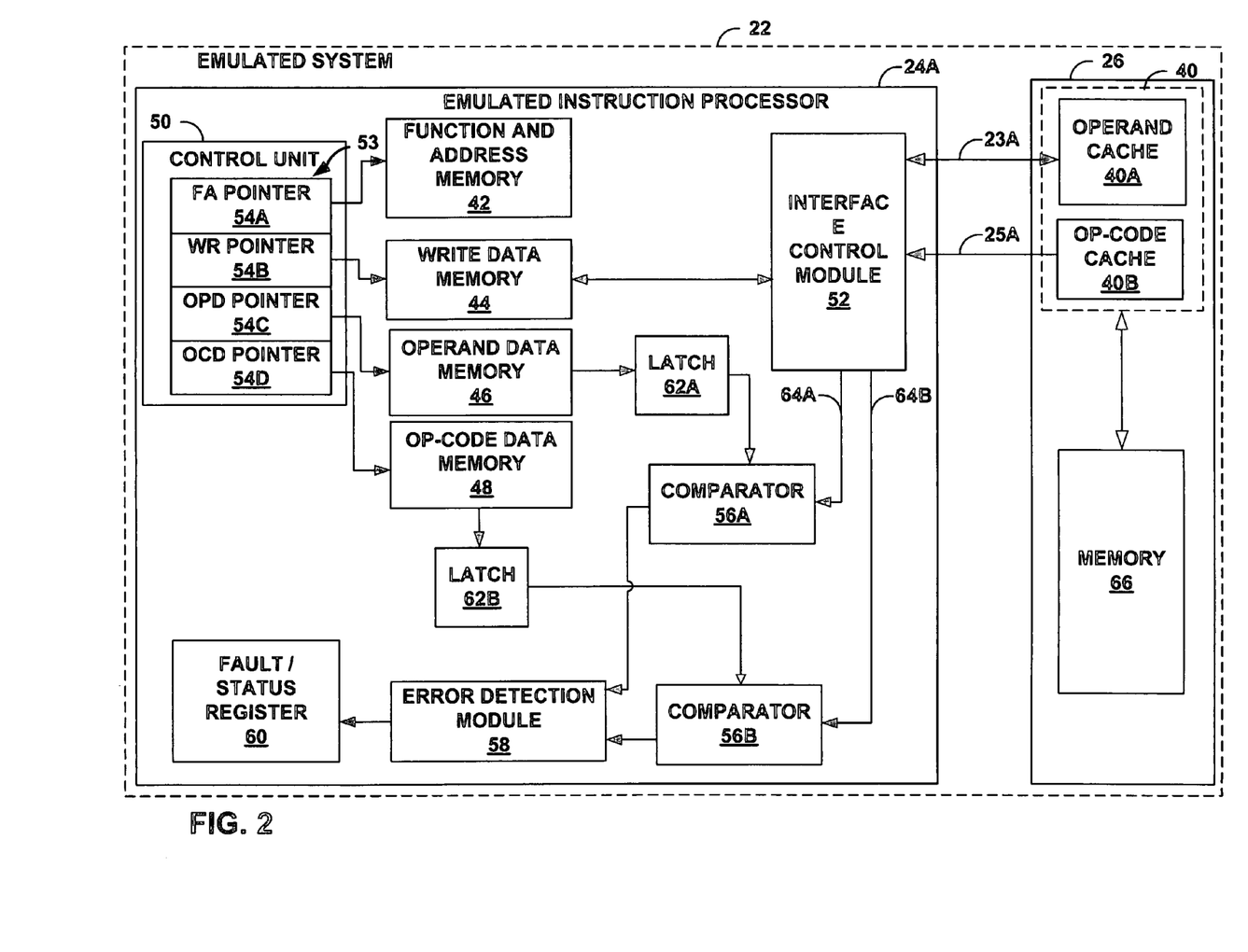
FIG. 2 is a block diagram illustrating an exemplary embodiment of an emulated system that operates within the emulation environment of FIG. 1

FIG. 2 is a block diagram illustrating an exemplary embodiment of emulated system 22 of FIG. 1 in further detail. As described above, emulated system 22 emulates a computer system in which at least one of emulated instruction processors 24 presents separate interfaces to memory architecture 26 for fetching operands and op-codes in parallel.

In the illustrated embodiment of FIG. 2, emulated instruction processor 24A includes operand interfaces 23A and op-code interface 25A that provide separate and independent connectivity to a set of second-level caches 40. In particular, operand interface 23A is coupled to an operand cache 40A and op-code interface 25A is coupled to op-code cache 40B. Second level caches 40 are coupled to memory 66, which may comprise one or more memory modules, such as random access memory (RAM), read-only memory (ROM), Flash memory, or other memory modules. Emulated instruction processor 24A, as described below, further includes separate data paths 64A and 64B. For ease of illustration, emulated instruction processor 24A is depicted in further detail although any of emulated instruction processors 24 may present separate interfaces 23 and 25 to respective second-level caches 40.

In the exemplary embodiment of FIG. 2, emulated instruction processor 24A includes a control unit 50, a plurality internal memories, i.e., a function and address (FA) memory 42, and a plurality of data memories 44-48. FA memory 42 stores one of instruction streams 19 in the form of executable instructions to test the functionality of other components included within emulation environment 10 (FIG. 1). The internal set of data memories 44-48 of emulated instruction processor 24A store reference data generated by test scripts 16 and compiler 18 as described above. In particular, write data memory 44 stores write data that emulated instruction processor 24A may write to operand cache 40A via operand interface 23A. Operand data memory 46 stores reference data for verifying the accuracy of operands received from operand interface 23A. Op-code data memory 48 stores reference data for verifying the accuracy of op-codes received from op-code interface 25A.

During operation, emulated instruction processor 24A communicates with second-level caches 40 via operand interface 23A and op-code interface 25A in a manner that accurately emulates interfaces of a fully implemented instruction processor having independent op-code and operand interfaces. In particular, operand interface 23A may comprise a cache interface for fetching operands from operand cache 40A in response to operand read requests issued by control unit 50. Additionally, operand interface 23A provides a cache interface allowing emulated instruction processor 24A to issue write requests to operand cache 40A. Similarly, op-code interface 25A may comprise a cache interface for fetching op-codes from op-code cache 40B in response to op-code read requests issued by control unit 50. In this manner, second-level caches 40 and memory architecture 26 may operate in a manner similar to conventional memory architectures.

To facilitate testing memory architecture 26 with respect to the separate op-code interface 25A and operand interface 23A, emulated instruction processor 24A may maintain a plurality of pointers 53 that control access to memories 42-48. In particular, each of pointers 53 corresponds to a respective one of the internal memories 42-48, and may be separately controlled by control unit 50. Control unit 50 updates each of pointers 53 when requests are issued to the corresponding interface, i.e., the corresponding one of operand interface 23A and op-code interface 25A. For example, upon issuing a read instruction to operand interface 23A, control unit 50 automatically increments operand data (OPD) pointer 54C associated with operand data memory 46 that stores reference data for verification of operands received via operand interface 23A. Similarly, upon issuing a read instruction to op-code interface 25A, control unit 50 automatically increments op-code data (OCD) pointer 54D associated with op-code data memory 48 that stores reference data for verification of op-codes received via op-code interface 25A. In this manner, emulated instruction process 24A coordinates the comparison of the correct reference data from memories 44-48 to the operands and op-codes received from independent interfaces 23A and 25A, thereby facilitating testing of the independent op-code and operand interfaces and the external components of memory architecture 26 connected thereto.

Emulated instruction processor 24A further includes comparators 56A and 56B, error detection module 58 and fault/status register 60. During execution, interface control module 52 receives operands and op-codes via operand interface 23A and op-code interface 25A, and directs the operands and op-codes to comparators 56A and 56B, respectively. Comparator 56A compares the reference data identified by OPD pointer 54C to the operand data received via operand interface 23A, and provides an indication of whether the expected operand has been received from operand cache 40A.

Similarly, comparator 56B compares the reference data identified by OCD pointer 54D to the op-code received via op-code interface 25A, and provides an indication of whether the expected op-code has been received from op-code cache 40B. Error detection module 58 analyzes the result generated by comparators 56A and 56B. In the event an error occurs, i.e., a mismatch has been detected by at least one of comparators 56A and 56B, error detection module 58 logs the error by updating error counts within fault/status register 60 and possibly recording other information associated with the error. For example, error detection module 58 may utilize fault/status register 60 to store an address from which the requested operand or op-code originated, the type of error, a copy of the requested operand or op-code, a copy of the reference data, a copy of the instruction and the like. This information may subsequently be used to aid designer 12 (FIG. 1) in debugging second-level caches 40 and memory 66 of memory architecture 26. In this manner, emulated instruction processor 24A may perform tests to validate other components, e.g., second-level caches 40 and memory 64 of memory architecture 26.

When executing test scripts 16, control unit 50 fetches instructions from function and address (FA) memory 42 via manipulating function and address (FA) pointer 54A. In particular, FA pointer 54A references a current instruction within the instruction stream generated by compiler 18 and stored within FA memory 42, as described above. More specifically, control unit 50 fetches a set of one or more instructions referenced by FA pointer 54A, and proceeds to execute the fetched instructions. Upon completing execution of a current instruction, control unit 50 updates pointers 53 based on the type of instruction previously executed. Control unit 50 moves function and address pointer 54A to reference the next instruction unless the previously executed instruction was a jump or loop instruction.

In the event a write instruction is encountered, control unit 50 issues a corresponding write request to interface control module 52. Interface control module 52 transmits the write request to operand cache 40A via operand interface 23A. Control unit 50 may fetch write data from write data memory 44 via write (WR) pointer 54B to be used during the write operation.

In the event the instruction is a read instruction, control unit 50 forwards a read request to interface control module 52. Interface control module 52, upon receiving the read request, outputs the read request to one of second-level caches 40 via one of interfaces 23A or 25A depending on the instruction. In response to a read operand instruction, interface control module 52 outputs a read operand request via operand interface 23A. In response to a read op-code instruction, interface control module 52 outputs a read op-code request via op-code interface 25A.

Upon receiving a read request, operand cache 40A, for example, acknowledges the read request and returns the requested data via operand interface 23A. In the event of a cache miss, operand cache 40A loads the requested data from memory architecture 26. As described above, interface control module 52 receives the operand and forwards the requested data to comparator 56A for verification. To facilitate the comparison, interface control module 52 may include a set of loadable mask memories to store bit masks. As described in further detail in reference to FIG. 5, the bit masks are applied to the results issued from comparators 56A, 56B.

In some embodiments, emulated instruction processor 24A includes latches 62A, 62B that latch operands and op-codes received from operand data memory 46 and op-code data memory 48, respectively. Latches 62A, 62B allow emulated instruction processor 24A to increase throughput since the latched data remains present despite updates to the corresponding pointers, e.g., pointers 54C, 54D. In this manner, consecutive read requests can be issued in closer succession providing increased throughput to accurately emulate an actual instruction processor.

Once control unit 50 finishes executing the loaded instruction stream, emulation control software 20 may analyze the contents of memory architecture 26, e.g., second level caches 40, memory 66 and fault/status register 60. Emulation control software 20 may identify errors and status information within fault/status register 60 and generate reports 30 to convey the errors and status information to designer 12.

In this manner, emulated instruction processor 24A emulates a processor having an operand interface 23A and an op-code interface 25A that may by used to independently fetch operands and op-codes from second-level caches 40. In some embodiments, both operand cache 40A and op-code cache 40B may reside within a single cache. For example, both the operand cache 40A and op-code cache 40B may be assigned to separate address ranges that logically designate each cache. Thus, operand interface 23A may access op-code cache 40B and op-code interface 25A may access operand cache 40A. However, these two interface, typically, are reserved for accessing their respective caches. In the illustrated embodiment, both operand cache 40A and op-code cache 40B are shown as two separate caches for ease of illustration. The invention should not be limited to separate caches and may be realized by one or more caches.

Emulated instruction processor 24A may further execute tests and provide fault and status logging to verify second-level caches 40, memory architecture 26 and associated memory controllers. By efficiently managing pointers 53, control unit 50 forwards reference data to comparators 56A, 56B to determine the validity of requested data. In the event an error occurs, error detection module 58 logs the error in fault/status register 60. Designer 12 may use reports 30 (FIG. 1) generated in part from errors contained with fault/status register 60 to debug other components, such as second-level caches 40.

Figure 3:
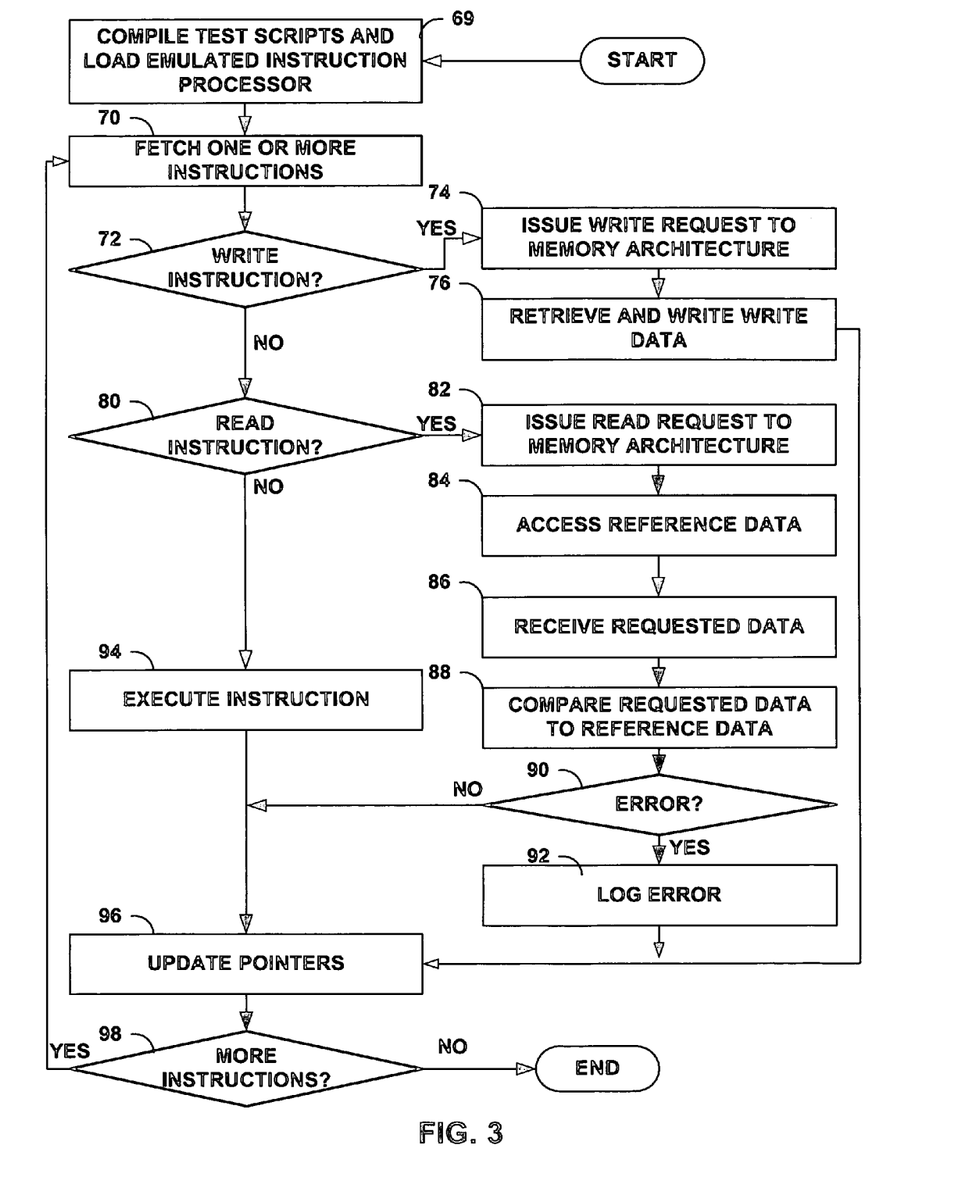
FIG. 3 is a flowchart illustrating techniques for emulating an instruction processor that includes separate interfaces to fetch operands and op-codes from a memory architecture.

FIG. 3 is a flowchart illustrating exemplary operation of an emulated instruction processor that provides independent emulated operand and op-code interfaces for verification of other components in accordance with the techniques described herein. In general, operation is described in reference to emulated instruction processors 24A (FIG. 2) within emulated system 22.

Initially, test scripts are compiled by compiler 18 and emulated instruction processor 24A is loaded with instruction streams 19 and the reference data generated during compilation (69). In particular, instruction streams 19 are loaded into FA memory 42, and respective portions of the generated reference data are loaded into write data memory 44, operand memory 46 and op-code memory 48, as described above. Once loaded, execution begins when control unit 50 of emulated instruction processor 24A fetches one or more instructions from the instruction stream loaded into FA memory 42 (70).

Control unit 50 processes each instruction to determine a respective instruction type. For example, an instruction may comprise a write instruction that specifies a write to an address within memory architecture 26 (72). In response to the write instruction, control unit 50 then issues a write request to data cache 40A via interface control module 52 and operand interface 23A (74). Control unit 50 retrieves write data from write data memory 44 via write pointer 54B and forwards the data to interface control module 52. Interface control module 52 issues the write data to operand cache 40A via operand interface 23A (76).

In response to a read instruction (80), control unit 50 forwards a read request to one of operand cache 40A or op-code cache 40B via interface control module 52 (82). Control module 52 may select the specific interface based on the particular type of read request. In an alternative embodiment, interface control module 52 may receive the instruction and, based on the instruction, determine which one of operand interface 23A or op-code interface 25A to transmit the read request.

After issuing the read request, control unit 50 accesses one of data memories 44-48 via a respective one of pointers 53 based on the particular type of read instruction being executed (84). For example, if the fetched instruction specifies an operand read, control unit 50 accesses operand data memory 46 via OPD pointer 54C. However, if the fetched instruction specifies an op-code read, control unit 50 accesses op-code memory 48 via OCD pointer 54D. Control unit 50 retrieves reference data from the accessed one of data memories 44-48 for use in testing the requested data (86). Control unit 50 may latch the reference data into one of latches 62A, 62B to enable control unit 50 to begin processing a next instruction, as described above.

Next, emulated instruction processor 24A compares the reference data with data actually received from memory architecture 26 in response to the read request (88). More specifically, upon receiving an operand from operand cache 40A, interface control module 52 forwards the operand along data paths 64A to comparator 56A. Similarly, receiving an op-code from op-code cache 40B, interface control module 52 forwards the op-code along data paths 64B to comparator 56B. Interface control module 52 receives and forwards the data to one of comparators 56A, 56B via a respective data path 64A, 64B. One of comparators 56A and 56B, depending upon whether an operand or op-code was received from memory architecture 26, compares the operand or op-code to the latched reference data (88).

Error detection module 58 determines whether an error has occurred, i.e., when the received operand or op-code differs from the reference data (90). In the event an error has occurred, error detection module 58 logs the error in fault/status register 60 (92). Error detection module 58 may log additional information pertinent to designer 12 for use in debugging operand cache 40A and op-code cache 40B and memory architecture 26 generally. After issuing the write request, control unit 50 updates WR pointer 54B to point to the next reference data value stored within write data memory 44, as described in further detail below.

In the event that the instruction is neither a write instruction nor a read instruction, control unit 50 executes the instruction (94). For example, emulated instruction processor 24A may support a rich instruction set.

For certain instructions, such as read and write instructions, control unit 50 updates pointers 53 to reference the correct portions of data memories 44-48 (96). This process is described in more detail in reference to FIG. 4. For a write instruction, control unit 50 updates WR pointer 54B to point to the next write data value stored within write data memory 44. For a read instruction, control unit 50 updates one of OPD pointer 54C or OCD pointer 54C depending on the type of read instruction encountered. For a flow control instruction, such as a jump instruction, branch instruction, loop instruction, or a halt instruction, control unit 50 updates each of WR pointer 54B, OPD pointer 54C and OCD pointer 54C to the same location within the instruction stream. In this manner, control unit 50 may independently update the pointers in response to read or write instructions, and nevertheless maintain synchronization of the pointers with respect to the execution of instruction stream 19.

Control unit 50 repeats the process of fetching and executing instructions to carry out the test procedures until all of the instructions have been executed, e.g., when a halt instruction has been processed, or execution is otherwise terminated (98).

Figure 4:
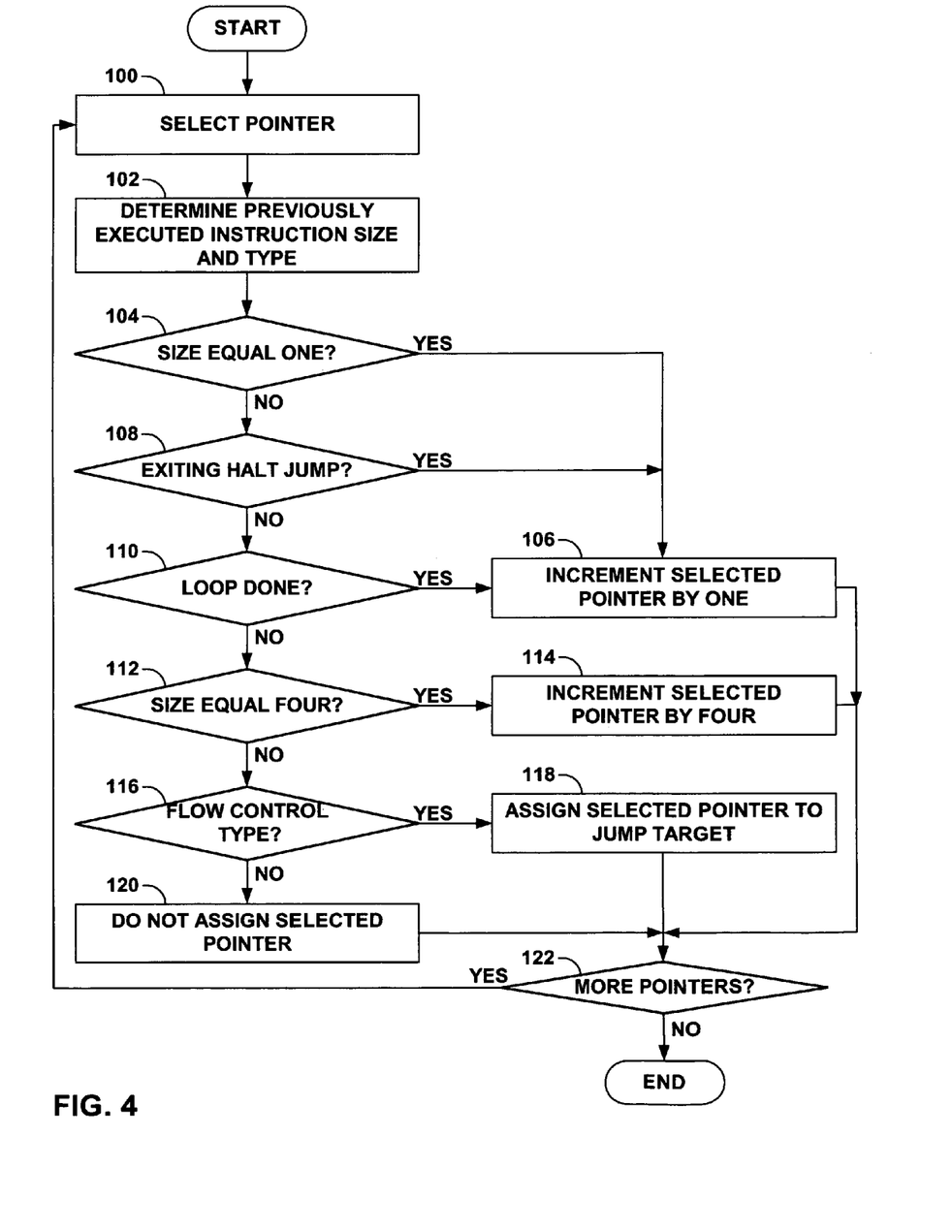
FIG. 4 is a flowchart further illustrating exemplary operation of the emulated instruction processor.

FIG. 4 is a flowchart further illustrating exemplary operation of an emulated instruction processor, e.g., emulated instruction processor 24A, when updating pointers 53 after execution of an instruction. As described above, control unit 50 updates pointers 53 independently, and may update one or more of the pointers based on the type of instruction executed. For example, control unit 50 may update FA pointer 54A and write pointer 54B after executing a write instruction without updating OCD pointer 54C or OCD pointer 54D. As another example, control unit 50 may update FA pointer 54A, write pointer 54B, OCD pointer 54C and OCD pointer 54D upon executing a jump instruction, thereby maintaining synchronization of the pointers relative to instruction stream 19 being executed.

Initially, control unit 50 selects one of pointers 53 (100). To properly update the selected one of pointers 53, control unit 50 determines the size, e.g., number of lines in memory, and type of the previously executed instruction (102). Emulated processor 24A may, for example, have an instruction set that includes instructions of varying sizes and types. An operand read instruction may, for example, have a size equal to one line in memory. Op-code read instructions, however, may have a size of four lines in memory.

If the instruction size equals one line (104), control unit 50 increments the address referenced by the selected one of pointers 53 by one (106). Similarly, control unit 50 increments the address reference the selected one of pointers 53 by one if the previously executed instruction exits a halt jump (108) or completes a loop (110). However, if the size does not equal one and the previously executed instruction does not exit a halt jump or complete a loop, control unit 50 then determines whether the size of the instruction equals four lines (112).

In the event that the previously executed instruction size equals four lines, control unit 50 increments the address referenced by the selected one of pointers 53 by four memory lines (114). In the event that the size does not equal four lines, control unit 50 determines whether the previously executed instruction is a flow control instruction, e.g., a loop, branch or jump instruction (116). If the previously executed instruction is a loop or a jump, control unit 50 assigns the selected one of pointers 53 to the target address of the flow control instruction (118). If the previously executed instruction is not a flow control instruction, control unit 50 does not alter the selected pointer (120).

In similar fashion, control unit 50 continues to update pointers 53 until all pointers have been selected and potentially updated based on the executed instruction (122). In this manner, emulated instruction processor 24A emulates an actual instruction processor having independent operand and op-code interfaces, and provides verification capabilities by way of error detection. By updating pointers 53, control unit 50 correctly synchronizes the comparison of reference data stored in data memory 44-48 with op-codes and operands independently received from second-level caches 40.

Figure 5:
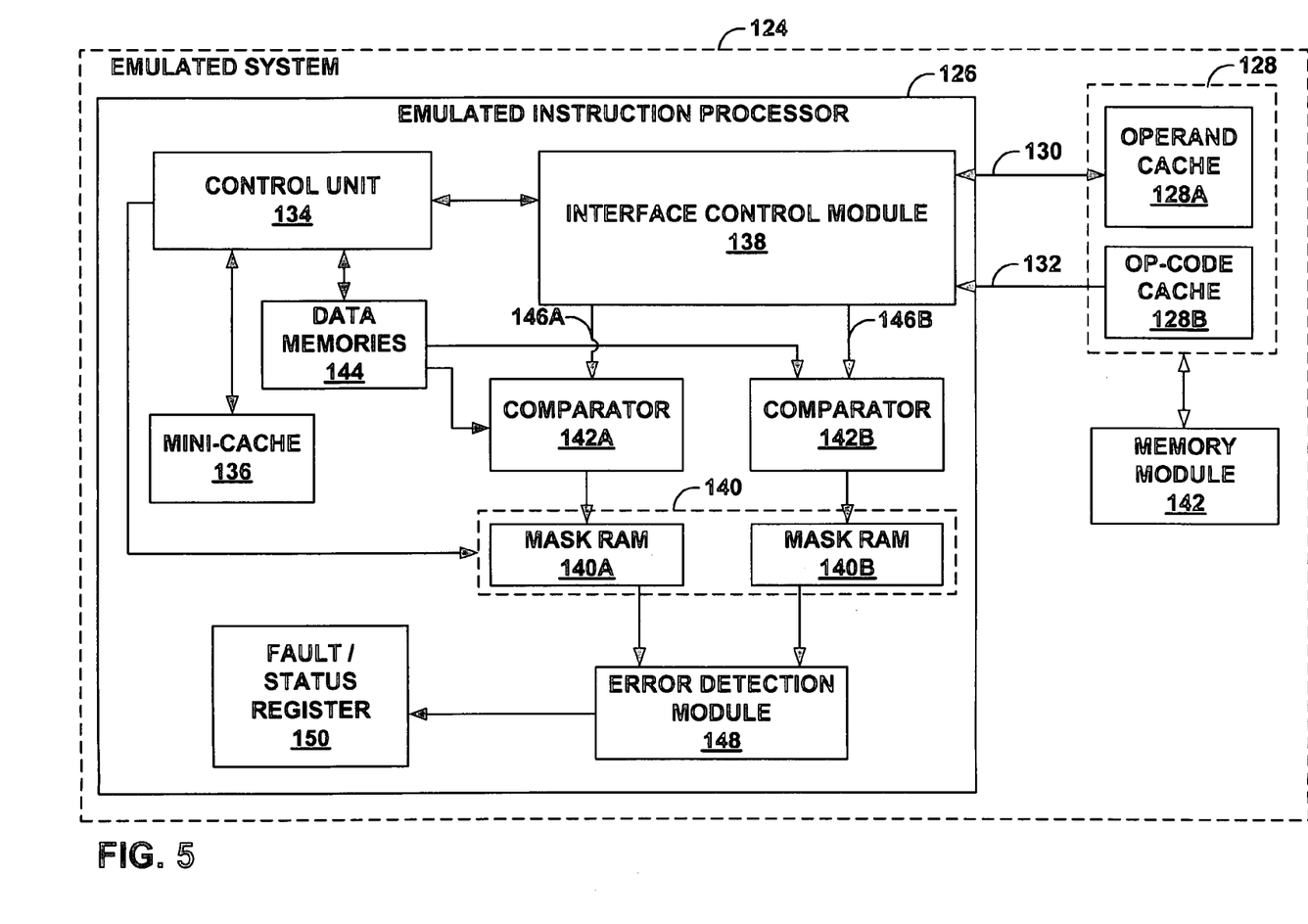
FIG. 5 is a block diagram illustrating another exemplary embodiment of an emulated system.

FIG. 5 is a block diagram illustrating another exemplary embodiment of an emulated system 124. Emulated system 124, as depicted in FIG. 5, includes emulated instruction processor 126 connected to second-level caches 128. Although not illustrated, emulated instruction processor 126 may include the constituent components of emulated instruction processor 24A, as illustrated in FIG. 2. For example, although not shown, control unit 134 may maintain a plurality of pointers, a plurality of data memories storing reference data, latches, comparators, and an error detection module for verification of second-level caches 128 and memory module 142.

In the illustrated embodiment of FIG. 5, emulated instruction processor 126 includes a mini-cache 136 which emulates the functionality of a level-one, on-chip cache without requiring implementation of the complexities associated with a full on-chip cache. In the embodiment illustrated in FIG. 5, upon executing an instruction, control unit 134 may query mini-cache 136 for an operand or op-code, depending upon the type of instruction. Mini-cache 136 emulates the functions of a level-one, on-chip cache, and provides an indication that the requested operand or op-code is present within the mini-cache.

Mini-cache 136 may be configured to separately track and test storage of operands and op-codes. For example, control unit 134 may manage mini-cache 136 when independently reading operand or op-code data from second-level caches 128. For example, control unit 134 may execute an operand read instruction and determine whether mini-cache 136 already has a valid copy of this data. Mini-cache 136 is referred to as a "mini-cache" because mini-cache 136 does not store the data like a true first level cache. Mini-cache 136 only stores a limited number of addresses. From these addresses emulated instruction processor 126 may know whether a valid copy of the data would exist within mini-cache 136. Therefore, emulated instruction processor 126 may utilize mini-cache 136 to enhance testing capabilities by only issuing a read to an address once a valid copy of an address has been invalidated within mini-cache 136. In some embodiments, emulated instruction processor 126 provides a configurable option allowing a designer, such as designer 12, to enable and disable whether control unit 134 waits to issue a read request for which mini-cache 136 already has a valid copy of the data. Thus, designer 12 can enable or disable mini-cache 136.

The exemplary embodiment of instruction processor 126 also includes a set of mask RAMs 140A and 140B (collectively mask RAMs 140). Each of mask RAMs 140 stores bit masks that may be applied to the results issued by comparators 142A, 142B. As described above, control unit 134 may access data memories 144 via pointers. Furthermore, control unit 134 may access reference data stored within data memories 144 via the pointers and provide the reference data to comparators 142A, 142B. Comparators 142A, 142B compare the data received from data memories 144 to data received via data paths 146A, 146B respectively. Emulated control unit 126 includes a mask RAM for each of interfaces 130 and 132 and applies mask rams 140 to the results issued by comparators 142A, 142B. In this manner, certain bits of each of the results from comparators 142A and 142B may be easily masked to verify the status of pertinent data bits received from each of the comparators. Control unit 136 may set mask rams 140 during emulation to enable emulated instruction processor 126 to apply a wide variety of masks. In some embodiments, control unit 136 may set mask rams 140 based on the type of instruction, data received and the like. Thus, mask rams 140 allow control unit 136 to determine specific errors while eliminating known errors. For example, designer 12 may know of a specific error and may still want to continue testing. Designer 12, in this instance, may generate a test script that causes control unit 136 to set mask rams 140 to mask these bits, thereby preventing detection of the known error. Mask rams 140 after masking the result from comparators 142A, 142B provide the masked result to error detection module 148. Error detection module 148 determines an errors and writes any detected errors, as described above, to fault/status register 150.

Various embodiments of the invention have been described. These and other embodiments are within the scope of the following claims.

The invention claimed is:

1. A processor-based method performed by software emulating an instruction processor, the method comprising;
   processing read instructions with an emulated processor executing within an emulation environment to output independent read requests via an operand interface and an op-code interface of the emulated processor to independently fetch op-codes and operands from an emulated memory external from the emulated processor;
   verifying that the emulated memory properly executed the independent read requests by independently comparing op-code reference data and operand reference data to the operands and the op-codes received in response to the read requests; and recording results of the independent comparisons.

2. The method of claim 1, wherein independently comparing further comprises:
    storing the op-code reference data and the operand reference data within a set of data memories of the emulated instruction processor;
    maintaining within the emulated instruction processor an operand data pointer to address the operand reference data and an op-code pointer to address the op-code reference data; and
    independently accessing the operand reference data with the operand data pointer and the op-code reference data with the op-code data pointer during processing of the read instructions to verify the received op-codes and the received operands.

3. The method of claim 2, further comprising:
    when processing the read instructions, determining whether each of the read instructions required an operand read request or an op-code read request; and
    independently updating the op-code reference pointer or the operand reference pointer based on the determination.

4. The method of claim 2, wherein the read instructions form part of an instruction stream executed by the emulated instruction processor, the method further comprising:
    processing a flow control instruction of the instruction stream with the emulated instruction processor; and
    upon processing the flow control instruction, synchronizing the op-code reference pointer and the operand reference pointer to respectively address a portion of the op-code reference data and a portion of the operand reference data associated with a target address of the flow control instruction.

5. The method of claim 2, compiling test software to output the operand reference data, the op-code reference data, and the instruction stream.

6. The method of claim 2, wherein independently comparing further comprises:
    latching the op-code reference data within a first latch within the emulated instruction processor; and
    comparing the latched op-code referenced data and the received op-codes with a comparator to produce the results.

7. The method of claim 2, wherein independently comparing further comprises:
    latching the operand reference data within a first latch within the emulated instruction processor; and
    comparing the latched operand referenced data and the received operand with a comparator to produce the results.

8. The method of claim 1, further comprising:
    storing write data within a data memory of the emulated instruction processor; maintaining within the emulated instruction processor a write data pointer to address the write data; and
    processing a write instruction with the emulated processor to output a write request via a data interface of the emulated processor, wherein the write request comprises a portion of the write data referenced by the write pointer.

9. The method of claim 1, further comprising generating a report based on the results, wherein the report identifies any of the received op-codes that do not match the op-code reference data and any of the received operands that do not match the operand reference data.

10. The method of claim 1, wherein recording results comprises storing addresses associated with received operands and the op-codes, copies of the received operands or op-codes, copies of the reference operands and the reference op-codes, or copies of the instruction.

11. The method of claim 1, wherein recording the results comprises recording the results within a register within the emulated instruction processor.

12. The method of claim 1, further comprising applying bit masks to at least a portion of a result of the independent comparisons of the op-code reference data and the operand reference data to the op-code and the operand received in response to the read requests.

13. The method of claim 1, further comprising:
    storing addresses of a small number of the received operands and received op-codes within a cache within the emulated instruction processor; and
    selectively enabling and disabling access to the cache when executing subsequent read instructions and waiting to output read requests via the operand interface and the op-code interface when the read instructions request operands and op-codes are invalidated within the cache based on a configurable option.

14. A processor-based system for emulating an instruction processor comprising:
    a computing system to provide an emulation environment; and
    software executing within the emulation environment to emulate an instruction processor having an operand interface and an op-code interface and to emulate a memory external to the instruction processor,
    wherein the software emulates the instruction processor by processing read instructions and outputting corresponding read requests on the operand interface and the op-code interface to independently fetch respective op-codes and operands from the emulated memory, and independently comparing op-code reference data and operand reference data to operands and op-codes received from the operand interface and the op-code interface in response to the read requests to verify that the memory properly executed the independent read requests.

15. The system of claim 14, wherein the software emulates the instruction processor by recording results of the independent comparisons within a register of the emulated instruction processor.

16. The system of claim 14, wherein the emulated instruction processor comprises:
    a first data memory to store the op-code reference data; and
    a second data memory to store the operand reference data.

17. The system of claim 16, wherein the emulated instruction processor comprises:
    a control unit that maintains an operand data pointer to address the operand reference data within the first data memory and an op-code pointer to address the op-code reference data within the second data memory,
    wherein the control unit independently accesses the operand reference data with the operand data pointer and the op-code reference data with the op-code data pointer during processing of the read instructions to verify the received op-codes and the received operands.

18. The system of claim 17, wherein upon processing the read instructions, the control unit determines whether each of the read instructions required an operand read request or an op-code read request, and independently updates the op-code reference pointer or the operand reference pointer based on the determination.

19. The system of claim 17, wherein the read instructions form part of an instruction stream executed by the emulated instruction processor, and upon processing a flow control instruction of the instruction stream, the control unit synchronizes the op-code reference pointer and the operand reference pointer to respectively address a portion of the op-code reference data and a portion of the operand reference data associated with a target address of the flow control instruction.

20. The system of claim 19, further comprising a compiler executing on the computing system to compile test software to output the operand reference data, the op-code reference data, and the instruction stream for execution by the emulated instruction processor.

21. The system of claim 19, wherein the emulated instruction processor further comprises:
a latch to latch the op-code reference data from the first data memory; and
a comparator to compare the latched op-code referenced data and the received op-codes.

22. The system of claim 19, wherein the emulated instruction processor further comprises:
a latch to latch the operand reference data from the second data memory; and
a comparator to compare the latched operand referenced data and the received operands.

23. The system of claim 14, wherein the emulated instruction processor further comprises:
a data memory to store write data; and
a control unit to maintain a write data pointer to address the write data, wherein the control unit processes a write instruction to output a write request via a data interface of the emulated processor, and further wherein the control unit generates the write request to comprises a portion of the write data referenced by the write pointer.

24. The system of claim 14, further comprising emulation control software executing on the computing system to generate a report that presents/identifies any of the received op-codes that do not match the op-code reference data and any of the received operands that do not match the operand reference data.

25. The system of claim 14, wherein the emulated instruction processor further comprises:
a set of memories to store bit masks; and
bit masks to compare results of the comparison of the received operands and the received op-codes to the reference operands and the reference op-codes to mask portions of these comparisons.

26. The system of claim 14, wherein the emulated instruction processor further comprises a cache to store addresses of the received operands and received op-codes, wherein the emulated instruction processor selectively waits to issue read requests for subsequent read instructions via the operand interface and the op-code interface until the read instructions request operands and op-codes become invalidated within this cache based on a configurable option.

27. A processor-based system, for emulating art instruction processor comprising:
compiling means for compiling test software to produce operand reference data, op code reference data, and an instruction stream having read instructions; and
emulating means for emulating an instruction processor having an operand interface and an op-code interface and for emulating a memory external to the instruction processor, wherein the emulating means comprises:
controlling means for controlling the emulated instruction processor to process the read instructions and output corresponding read requests on the operand interface and the op-code interface to independently fetch respective operands and op-codes from the emulated memory,
receiving means for receiving operands and op-codes from the operand interface and the op-code interface in response to the read requests, and
comparing means for independently comparing the op-code reference data and the operand reference data to the operands and the op-codes received from the operand interface and the op-code interface in response to the read requests to verify that the emulated memory properly executed the read requests.

28. The system of claim 27, wherein the emulating means further comprises:
a first storing means for storing the op-code reference data; and
a second storing means for storing the operand reference data.

29. The system of claim 27, wherein the controlling means comprises:
first referencing means for addressing the operand reference data within the first storing means; and
second referencing means for addressing the op-code reference data within the second storing means.

30. The system of claim 27, further comprising reporting means for generating a report that presents and identifies any of the received op-codes that do not match the op-code reference data and any of the received operands that do not match the operand reference data.

* * * * *